US005996842A

United States Patent [19]

Riley et al.

[11] Patent Number: 5,996,842

[45] Date of Patent: Dec. 7, 1999

[54] APPARATUS AND METHOD FOR DISPENSING A COOL BEVERAGE

[75] Inventors: Michael J. Riley, Alpharetta; Thomas G. North, III, Woodstock; Ronald E. Grimm, Grayson, all of Ga.

[73] Assignee: The Coca-Cola Company, Atlanta, Ga.

[21] Appl. No.: 09/103,945

[22] Filed: Jun. 24, 1998

[51] Int. Cl.[6] .................................................... G01F 11/00

[52] U.S. Cl. ........................ 222/1; 222/129.1; 222/146.6; 62/332

[58] Field of Search .............................. 222/1, 54, 129.1, 222/146.6; 62/332, 434, 435

[56] References Cited

U.S. PATENT DOCUMENTS

| | | | |
|---|---|---|---|
| 2,536,840 | 1/1951 | Cornell, Jr. | 257/187 |
| 2,638,754 | 5/1953 | Kleist | 62/126 |
| 3,808,827 | 5/1974 | Avon et al. | 62/435 |
| 4,233,817 | 11/1980 | Toth | 62/332 |
| 4,555,045 | 11/1985 | Rodth et al. | 222/1 |
| 4,674,296 | 6/1987 | Renaud | 62/389 |
| 4,676,400 | 6/1987 | Lamont et al. | 222/1 |
| 4,730,463 | 3/1988 | Stanfill | 62/399 |
| 4,856,678 | 8/1989 | Stanfill et al. | 222/108 |
| 4,949,552 | 8/1990 | Adams | 62/196.4 |
| 5,079,927 | 1/1992 | Rodino et al. | 62/99 |
| 5,249,710 | 10/1993 | Hassell et al. | 222/146.6 |
| 5,437,395 | 8/1995 | Bull et al. | 222/146.6 |
| 5,564,602 | 10/1996 | Cleland et al. | 222/146.6 |
| 5,706,883 | 1/1998 | Ward | 62/434 |
| 5,743,107 | 4/1998 | Kyees | 222/146.6 |
| 5,911,341 | 6/1999 | Donselman et al. | 222/146.6 |

FOREIGN PATENT DOCUMENTS

| | | | |
|---|---|---|---|
| 472117 | 9/1937 | United Kingdom | 62/332 |
| 2194508 | 3/1988 | United Kingdom | 222/146.6 |

*Primary Examiner*—Joseph A. Kaufman
*Attorney, Agent, or Firm*—Alston & Bird LLP

[57] ABSTRACT

An apparatus and method for dispensing a cool beverage which includes a metal cold plate which is cooled by ice in an ice bin of the apparatus. The beverage dispensing conduit extends through the cold plate so as to be cooled thereby, and a cooling conduit also extends through the cold plate so that a cooling medium may be passed through the cooling conduit to supplement the cooling provided by the ice. In a preferred embodiment, the cooling medium utilizes a portion of the chilled glycol of an otherwise conventional refrigerated beer dispensing system.

15 Claims, 6 Drawing Sheets

APPARATUS AND METHOD FOR DISPENSING A COOL BEVERAGE

FIELD OF THE INVENTION

The present invention relates generally to beverage dispensers, and more particularly, to an apparatus and method for dispensing a cool beverage utilizing an enhanced cooling system.

BACKGROUND OF THE INVENTION

Beverage dispensers are used throughout the world in public facilities such as cafeterias, bars, restaurants, arenas and stadiums to dispense carbonated beverages, water, and other beverages to consumers. These dispensers usually employ either mechanical refrigeration systems or bulk refrigerants, such as ice, to cool the beverages before dispensing.

In many locations where the beverages are sold, such as ball parks, picnics, and carnivals, it is either impossible or impractical to use a large mechanical refrigeration system, and in these instances, bulk refrigeration is desirable because the bulk refrigerant, e.g. ice, is potable so that it can be included in the drink after the beverage is dispensed into the cup.

When beverages are cooled by bulk refrigeration, an ice bin is typically provided with a "cold plate" which forms the bottom of the ice bin. The ice is placed within the bin on the top of the cold plate so that the ice is accessible to the user to include in the drink. The cold plate is generally constructed of an aluminum casting having stainless steel tubing imbedded therein in serpentine shaped fluid passages within which the beverages and/or beverage components (syrups and water) are passed before they are dispensed. The ice on top of the cold plate thus cools the beverages and/or beverage components traveling through the serpentine passages via the heat conducted through the aluminum cold plate. Commonly, two beverage components, such as carbonated water and syrup, are mixed at the dispensing valve. With this arrangement, the consumer is provided with a chilled beverage and a source for ice to include in the beverage. A beverage dispensing apparatus of this general type is further disclosed in U.S. Pat. No. 4,555,045, the disclosure of which is incorporated by reference.

Although bulk refrigeration is a common method of cooling carbonated beverages, this method does have several drawbacks. For example, the heat transfer from the beverage to the ice is limited because of the ice surface area in contact with the cold plate surface. This is due to the physical design limitations of the ice bin, and air pockets between the ice cubes, which prevent the cubes from completely covering the cold plate surface.

Another drawback of bulk refrigeration is that the volume of beverages that can be cooled by this refrigeration method necessarily depends on the physical size of the cold plate. Because the beverages and/or beverage components must travel through the cold plate prior to dispensing, the number of lines that can pass through the plate is a function of the width, height and thickness of the plate. Thus, the number of fountain dispenser valves and the number of customers served is limited by the size of the cold plate. In many business establishments which dispense large quantities of beverages, increasing the size of the cold plate is not an option because of space limitations.

In an effort to solve the problems of bulk refrigeration, some systems, such as the system disclosed in U.S Pat. No. 4,856,678, attempt to precool the cold plate by collecting the melted ice water from the ice bin, and then passing the melted ice water through the cold plate. Although such systems may improve the performance of the beverage dispenser, they do not address the problems of increased volume demand and customer service associated with counter space and cold plate physical limitations. Indeed, some of these systems likely increase the cost to the retailer of operating and maintaining the systems because of the increased counter space required by the systems.

It is accordingly an object of the present invention to provide a more efficient bulk refrigeration system for a beverage dispenser, which is capable of dispensing a large volume of chilled beverages in multiple flavors and which is designed to minimize the operating and maintenance costs of the system to the retailer and minimize the counter space requirements.

SUMMARY OF THE INVENTION

These and other objects and advantages are achieved, according to the invention, by an apparatus for dispensing a cool beverage which includes a housing, and an ice bin within the housing. The ice bin includes a cold plate that forms at least one wall of the bin such that the ice that is received in the bin cools a surface of the cold plate. The dispensing apparatus also includes at least one dispensing valve mounted on the housing and at least one beverage conduit leading to the dispensing valve. A portion of the beverage conduit is embedded in the cold plate and extends within a plane which is parallel to the surface of the cold plate that is exposed to the ice. Further, a cooling conduit is provided which has a portion that is embedded in the cold plate. The embedded cooling conduit lies in a plane parallel to the plane of the beverage conduit, and it also lies on the side of the beverage conduit opposite from the cold plate surface which is contacted by the ice within the bin. With this arrangement, a cooling medium may be passed through the cooling conduit to efficiently supplement the cooling of the cold plate provided by the ice in the bin, and as a result, the apparatus of the present invention is capable of dispensing a large volume of chilled beverage in multiple flavors.

The source of the coolant may be any existing source that can provide a coolant which has a temperature below the temperature of the beverage, such as chilled water or a refrigerant. However, the present invention is uniquely adapted to utilize the cooling capacity of the chilled glycol commonly used in beer dispensing systems, which are often located in close proximity to beverage dispensers of the above described type.

In such beer dispensing systems, a beer delivery line typically runs from a keg to a dispensing tap, and the beer delivery line is cooled by a chilled glycol line which runs along with the beer delivery line in a heat exchange relationship. In accordance with this embodiment of the present invention, a portion of the chilled glycol of the beer dispensing system is diverted to serve as the source of the coolant for the beverage dispenser of the invention. The chilled glycol is at a temperature which is ideally suited to supplement the cooling provided by the ice, and in locations where the beer delivery system is already in place, it can be connected and used with little additional expenditure. Thus the apparatus of the invention is able to minimize the operating and maintenance costs of the system to the retailer through its design and compatibility with other existing refrigeration systems.

BRIEF DESCRIPTION OF THE DRAWINGS

Some of the objects and advantages of the invention have been set forth and other objects and advantages of the invention will become apparent in the detailed description of the preferred embodiments of the invention to follow, especially when taken in conjunction with the accompanying drawings, which are not necessarily drawn to scale.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
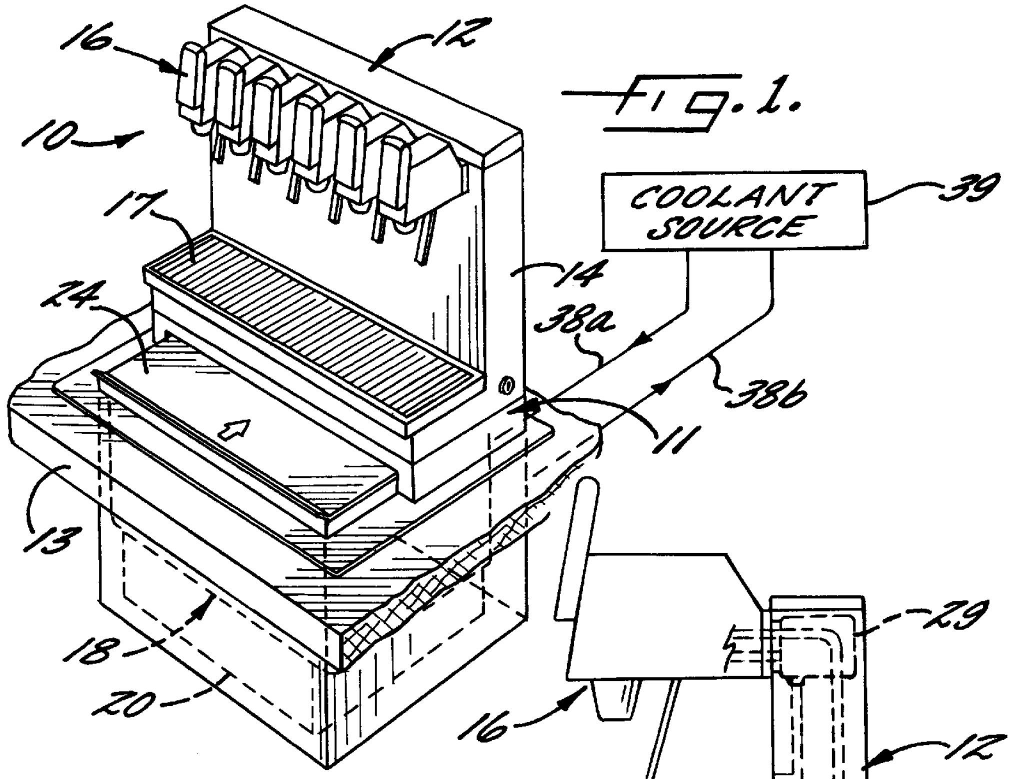
FIG. 1 is an environmental perspective view of a fountain drink dispenser embodying an apparatus for dispensing cool beverages which embodies the present invention.

FIG. 1 illustrates an apparatus 10 for dispensing any one of several cool beverages, and which comprises a generally box-like housing 11 which is in the form of a conventional fountain drink dispenser drop-in counter unit 12. The fountain drink dispenser drop-in unit 12 is designed to be inserted partly below and rest upon a counter top 13 in a beverage serving area.

While the illustrated embodiments and the following description describe the apparatus and method of the present invention in conjunction with a fountain drink dispenser drop-in counter unit, the dispensing apparatus 10 need not take the form of a drop-in unit, but can instead be any type of fountain drink dispenser unit, such as ice-beverage combination dispensers and ice bin/bar gun combinations. In addition, while a dispensing tower 14 with six dispensing valves 16 is illustrated, it will become clear from the following description that a dual dispensing tower arrangement and/or more or fewer dispensing valves may be used with the dispensing apparatus according to the present invention.

Figure 2:
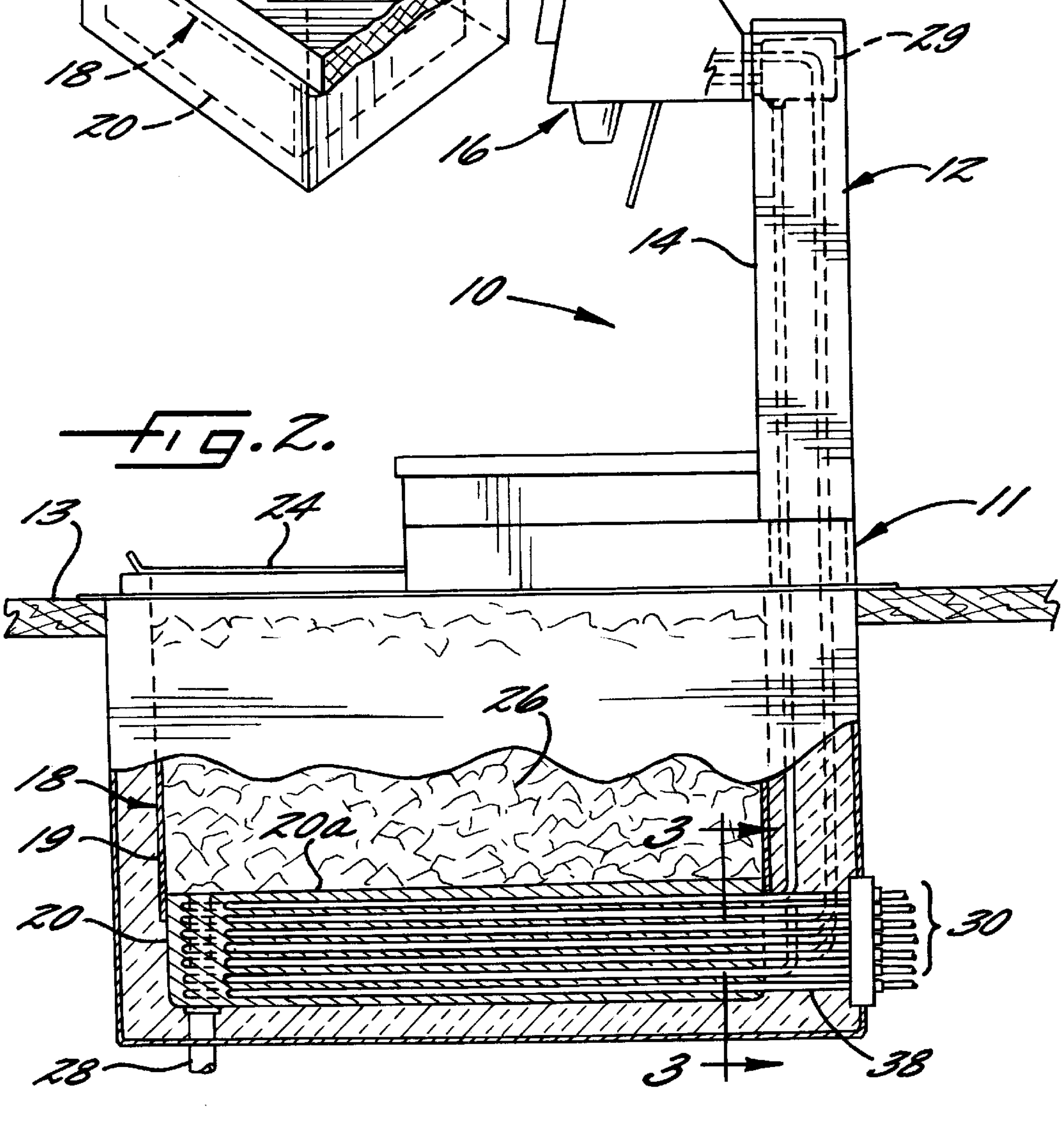
FIG. 2 is a partial cross-sectional view of the fountain drink dispenser showing the cold plate of the dispensing apparatus.

In addition to the dispensing tower 14 and the plurality of dispensing valves 16, the housing 11 mounts an ice bin 18 which is composed of rectangular side walls 19, and a cold plate 20. The cold plate 20 is typically made of cast aluminum and a surface **20*a* of the cold plate 20 forms the bottom surface of the ice bin 18 so as to be in direct heat exchange relationship with the ice in the bin. An ice bin cover 24 is included to be slid open and allow a quantity of ice 26 to be deposited in the bin 18 such that the surface 20*a* of the cold plate 20 is cooled by the ice 26, as shown in FIG. 2. The bottom of the ice bin 18 and the cold plate 20 may be oriented in an angled fashion towards a drain 28 for water run-off from melting of the ice 26**.

Figure 3:
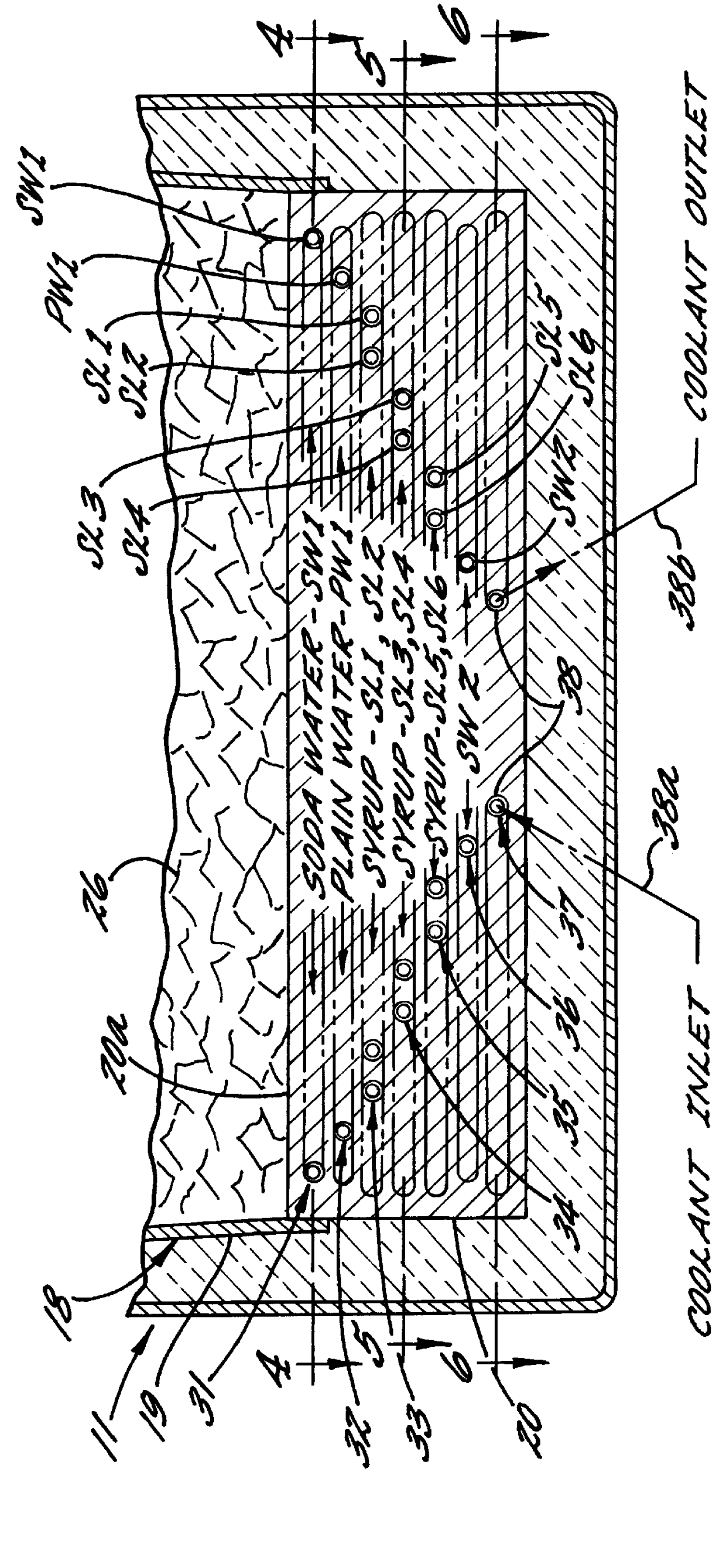
FIG. 3 is an enlarged partial cross-sectional view of the cold plate taken along line 3—3 of FIG. 2.

The cold plate 20 includes a plurality of beverage conduit lines 30 extending parallel to the surface **20*a* through the cold plate 20. The separate beverage conduit lines 30 are routed from soda water (carbonated water), plain water, and fountain drink syrup sources, through the cold plate, and to the plurality of dispensing valves 16. In post-mix systems, the soda water is delivered from the cold plate 20 to a manifold 29 in the tower 14, and then delivered to the separate valves 16, where it is mixed with the flavored syrups within the dispensing valves 16 as the resulting beverage is dispensed. Depending on the dispenser, the manifold may alternatively be located in the cold plate. The plain water line, which is shown in FIG. 3**, is provided in fountain drink dispensers so that chilled tap water is available for non-carbonated beverages and is easily accessible to the consumer.

Referring again to FIG. 3, one embodiment of dispensing apparatus 10 includes six serpentine shaped coil packs 31, 32, 33, 34, 35, and 36. Each coil pack 31–36 resides in a plane parallel to the cold plate surface **20*a* and is made up of a beverage conduit line or a combination of beverage conduit lines running through cold plate 20 in a serpentine configuration. The beverage lines making up coil packs 31–36** are typically constructed of stainless steel or similar metal tubing.

Figure 4:
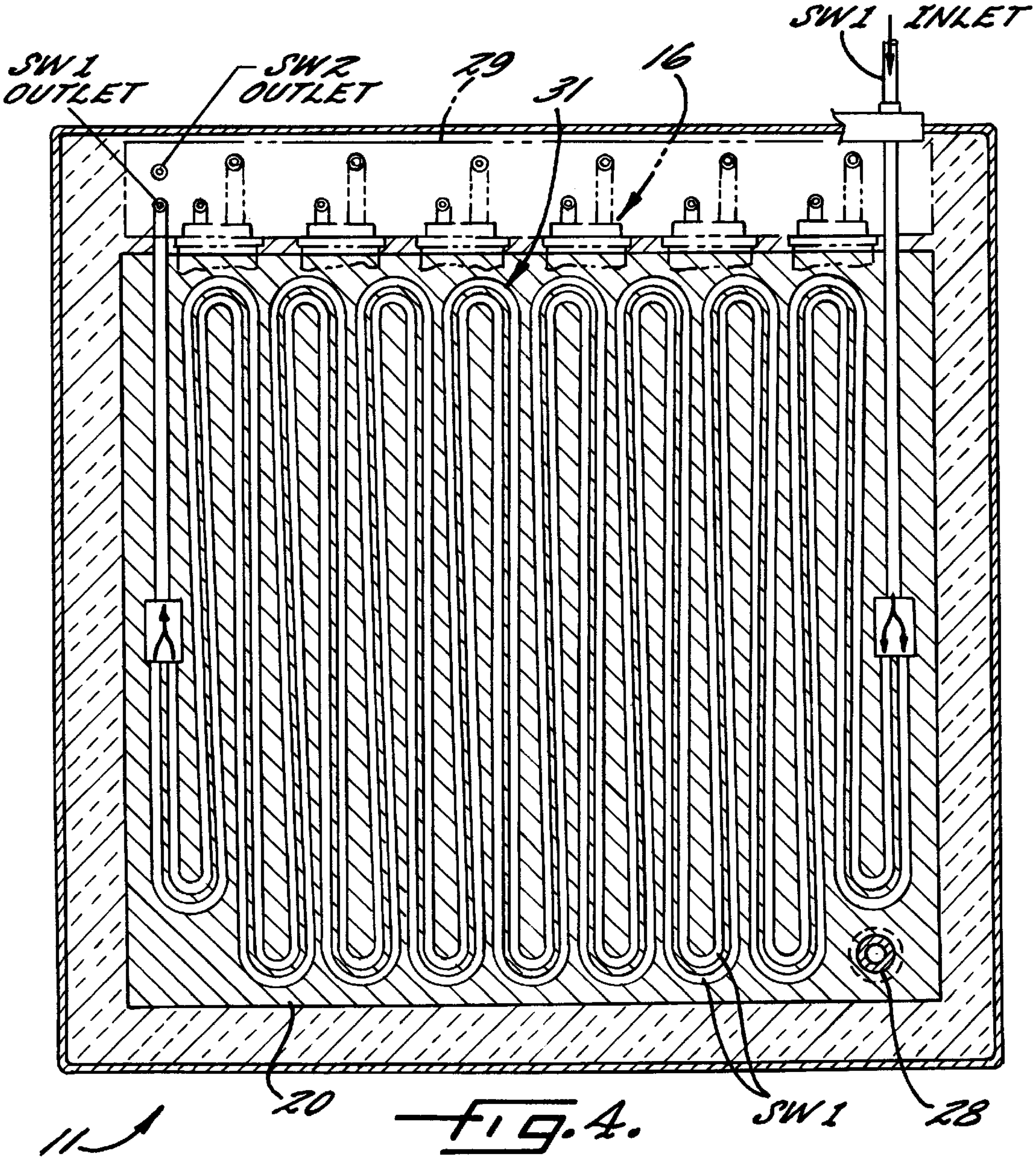
FIG. 4 is a top plan sectional view of the cold plate taken along line 4—4 of FIG. 3 and illustrates a soda water beverage conduit coil pack of the dispensing apparatus in a serpentine configuration.

The coil pack 31 is made up of a single soda water line SW1, the coil pack 32 is made up of a single plain water line PW1, and the coil pack 36 is made of a single soda water line SW2. The configuration of these coil packs is shown in FIG. 4, which illustrates the serpentine configuration with regard to coil pack 31. Two coil packs 31 and 36 are used to supply soda water, since carbonated beverages require a large amount of chilled soda water; i.e. approximately eighty percent (80%) soda water. The coil pack 33 is made up of the single plain water conduit line PW1 to provide a sufficient volume of chilled tap water to the consumer or a beverage including plain water.

As demonstrated in FIG. 4 illustrating the configuration of the soda water conduit line SW1, the respective soda water beverage conduit lines SW1, SW2 and the plain water conduit line PW1 each branch into two separate beverage conduit lines upon entry of the respective lines SW1, SW2, PW1 into the cold plate 20, and merge back into single conduit lines before the lines exit the cold plate 20. This arrangement enhances the chilling of the soda water in coil packs 31, 36 and the tap water in coil pack 32 by increasing the surface area of stainless steel tubing exposed to the thermal gradient through the cold plate 20 created by the temperature difference between the ice 26 and the beverage within the conduit lines.

Figure 5:
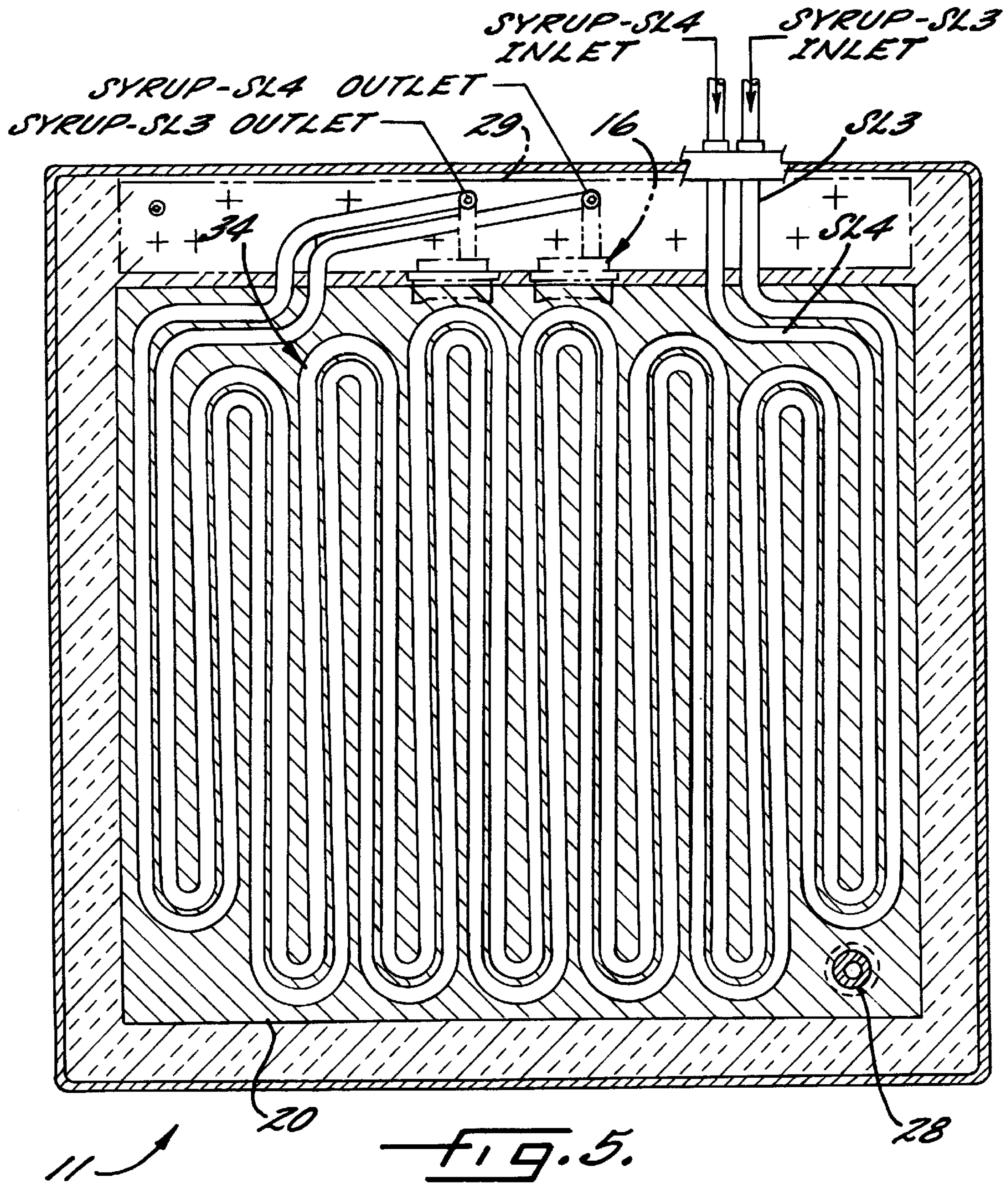
FIG. 5 is a top plan sectional view of the cold plate taken along line 5—5 of FIG. 3 and illustrates a syrup beverage conduit coil pack of the dispensing apparatus in a serpentine configuration.

The coil packs 33, 34, and 35, are not made up of single beverage conduit lines as are the soda water and plain water coil packs, but instead are created by a combination of syrup conduit lines. Specifically, as shown in FIG. 3, coil packs 33, 34, and 35 are made up of syrup conduit lines SL1 and SL2, syrup conduit lines SL3 and SL4, and syrup conduit lines SL5 and SL6, respectively. The serpentine configuration of these coil packs is demonstrated in FIG. 5, illustrating the coil pack 34. In this arrangement, two syrup flavors (or one flavor traveling in two separate lines) are chilled inside of one coil pack within the cold plate 20. After exiting the cold plate 20, the chilled syrups within the conduit lines travel to the dispensing tower 14 where the respective flavored syrups are mixed with either soda or plain water, and then dispensed through their respective dispensing valves 16. Although possible, it is not critical that the syrup coil packs 33, 34, and 35 each be made up of a single syrup conduit line. The syrup typically only makes up approximately twenty percent (20%) of a carbonated beverage or a beverage including plain water. Thus, the single syrup lines are able to provide sufficient cooling capacity.

Figure 6:
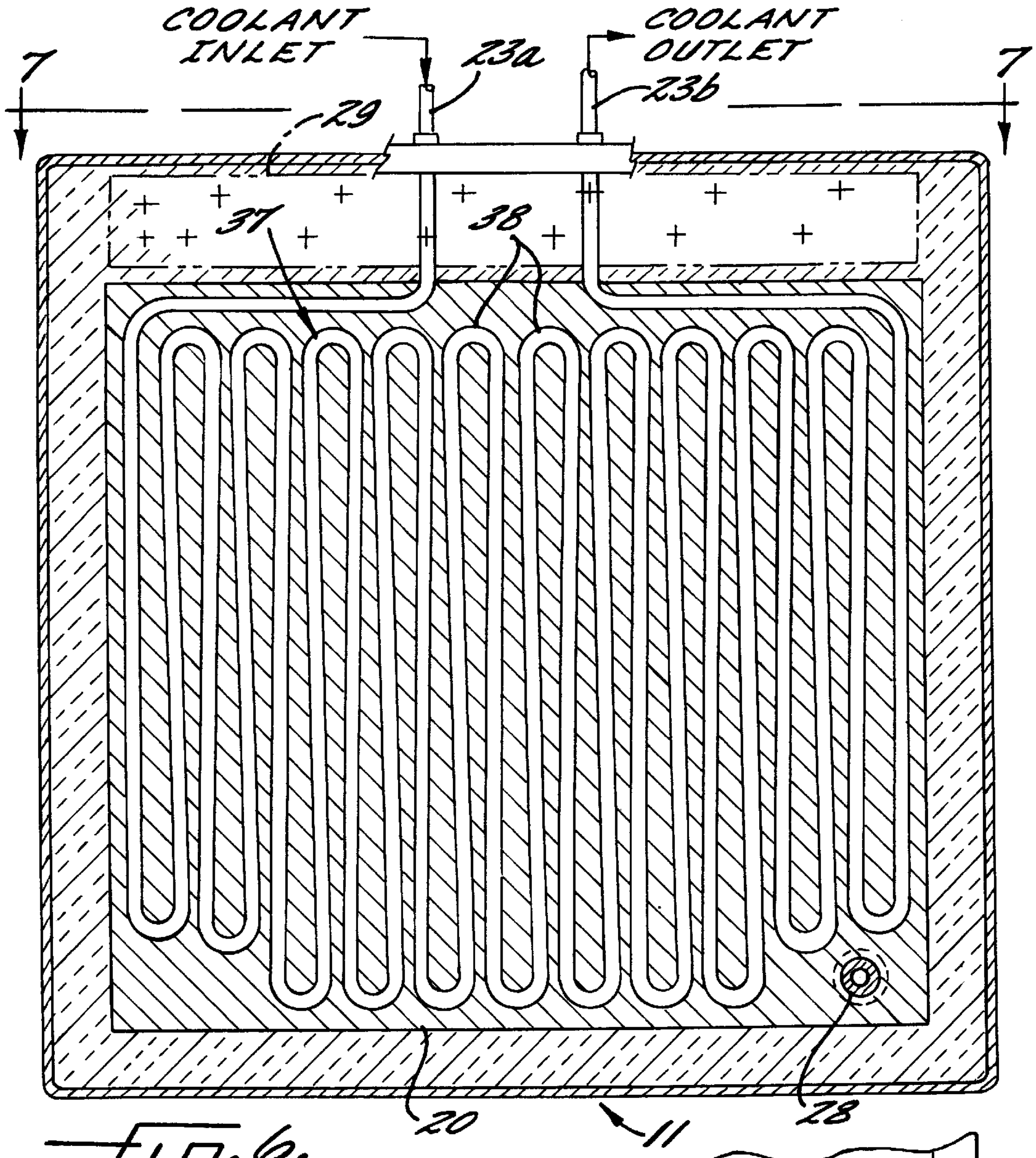
FIG. 6 is a top plan sectional view of the cold plate taken along line 6—6 of FIG. 3 and illustrates a coolant conduit coil pack of the dispensing apparatus in a serpentine configuration.

Referring again to FIG. 3, a coolant coil pack 37 is included at the bottom of the cold plate 20 to increase the thermal gradient through cold plate 20 provided by the ice 26, thereby enhancing the chilling of the liquid in coil packs 31–36. As FIG. 6 demonstrates, the coolant coil pack 37 is formed by a recirculating fluid coolant conduit line 38 running through the cold plate 20 in a serpentine configuration. The coolant fluid is circulated through the conduit line 38 via an inlet line 38*a* and an outlet line 38*b*, which lead to a coolant source 39, as shown in FIG. 1. While the coolant coil pack 37 is illustrated in FIG. 6 as a single line 38, it could constitute a double line as shown in FIG. 4 with respect to the soda water coil pack 31.

The coolant may be any fluid that has a lower temperature than the soda water/plain water/syrup in coil packs 31–36, such as a glycol based coolant or cold water. Preferably, to maximize chilling, the flow of the coolant within the coolant conduit line 38 is opposite the direction of flow of the fluid within beverage coil packs 31–36, as shown in FIG. 3. The opposing fluid flow creates the greatest temperature gradient possible at the point in the cold plate 20 where the plurality of beverage conduit lines 30 exit the cold plate 20.

As can be appreciated by reference to FIG. 3, including the coolant coil pack 37 at the bottom of the cold plate 20 augments the cooling provided to the coil packs 31–36 by the ice 26 on the cold plate surface 20*a*. The coolant coil pack 37 thereby provides increased efficiency to dispensing apparatus 10 through increased chilling and decreased ice consumption. Likewise, by placing the soda water beverage conduit line SW1 in close proximity to the cold plate surface 20*a* and the soda water beverage conduit line SW2 in close proximity to coolant coil pack 37, the efficiency and volume output of dispensing apparatus 10 is increased. By this placement, the soda water conduit lines SW1, SW2 are exposed to the maximum thermal gradient created by the ice 26 and the coolant coil pack 37 within the cold plate 20 because the temperature of the fluid within the coil packs 31–36 is a function of the distance of each respective coil pack from the ice 26 and the coolant coil pack 37.

Figure 7:
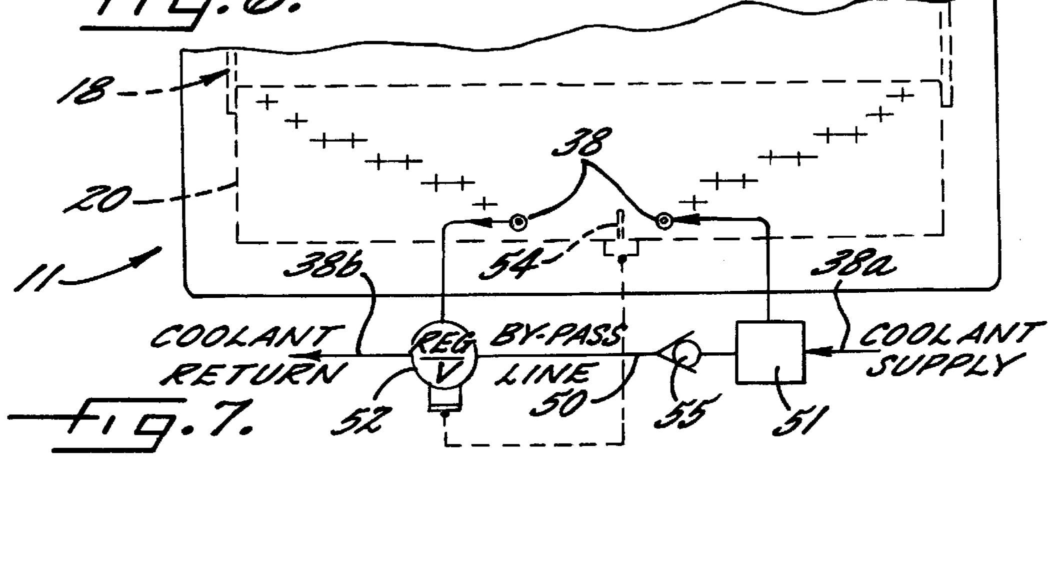
FIG. 7 is a fragmentary rear view of the cold plate taken along line 7—7 of FIG. 6.

In one embodiment of the dispensing apparatus 10, shown in FIG. 7, when a glycol coolant fluid is used, a recirculating by-pass loop 50 is used in conjunction with the coolant conduit line 38 to recirculate a portion of the warmed coolant exiting the cold plate 20 back into the coolant line 38 so as to blend with and warm the coolant entering the cold plate 20. The recirculating by-pass loop 50 thereby prevents the glycol coolant from freezing the soda water/plain water/syrup within the beverage coil packs 31–36. More particularly, the glycol coolant enters a mixer block 51 and then flows through the line 38 in the cold plate 20 to a regulator valve 52, which normally is set to direct the coolant to the outlet line 38*b*. The regulator valve 52 is controlled by a temperature sensor 54 located in the cold plate, such that upon the cold plate falling below a predetermined temperature, the regulator valve 52 shifts to direct a portion of the flow through the bypass loop 50 and back into the mixer block 51 via the one way check valve 55.

By placing the coolant coil pack 37 at the bottom of the cold plate 20 and augmenting the cooling provided by the ice 26 on the cold plate surface 20*a*, the coolant coil pack 37 also can be used to increase the beverage volume output of the fountain drink dispenser 12. For example, in the embodiment of dispensing apparatus 10 shown in FIG. 8, the number of the plurality of dispensing valves 16 is increased to twelve (12) by using a double stack coil pack arrangement.

In the double stack arrangement, the cold plate 20 embeds not only the coil packs 31–36, but also the coil packs 41–46. Preferably, the arrangement of coil packs 41–46 within the cold plate 20 is a mirror image of the arrangement of the coil packs 31–36. In particular, like coil packs 31, 32, and 36, the coil pack 41 is made up of a single soda water conduit line SW3, the coil pack 42 is made up of a single plain water conduit line PW2, and the coil pack 46 is made of a single soda water conduit line SW4. Similarly, the coil packs 43, 44, and 45, like the coil packs 33, 34, and 35, are made up of syrup conduit lines. Specifically, the coil packs 43, 44, and 45 are made up of syrup conduit lines SL7 and SL8, syrup lines SL9 and SL10, and syrup lines SL11 and SL12, respectively.

In this configuration, the coolant coil pack 37 is again positioned at the bottom of the cold plate 20 to augment the cooling provided by the ice 26 to the surface 20*a* of the cold plate 20. Although the coil pack 37 is positioned at the bottom of the cold plate 20, it will be apparent to those skilled in the art that the coolant coil pack 37 can be positioned parallel to the cold plate surface 20*a* at different locations within the cold plate 20. Alternatively, multiple coolant coil packs can be used throughout the cold plate 20 to supplement the cooling provided by the ice 26.

Figure 8:
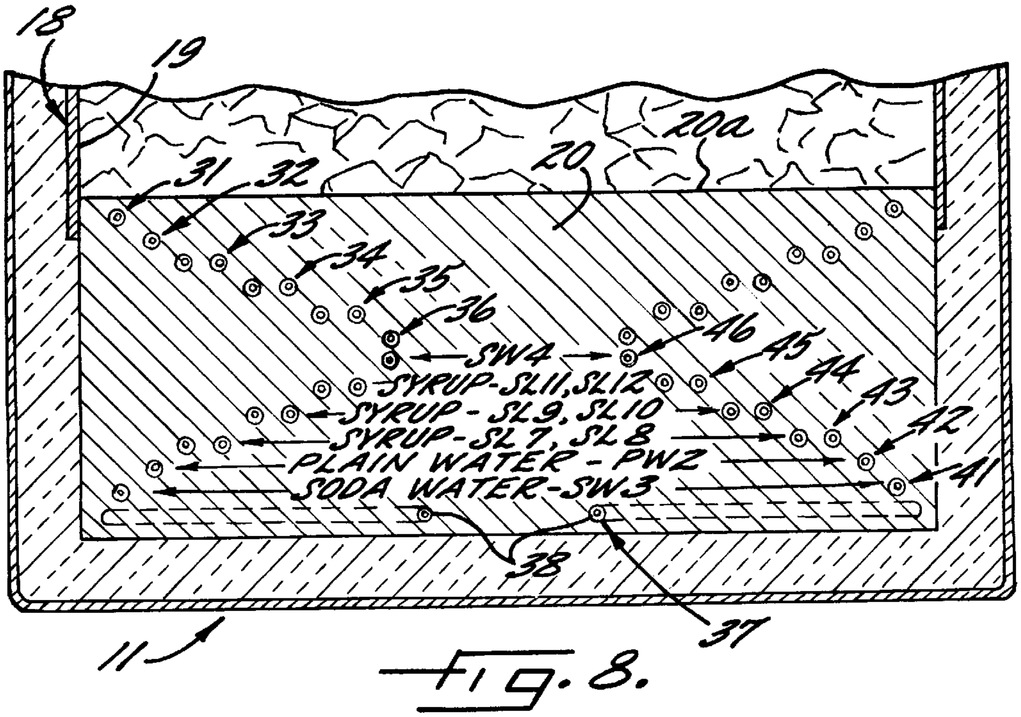
FIG. 8 is a sectional view of the cold plate and illustrates an alternative embodiment of the dispensing apparatus according to the present invention.

The embodiment of dispensing apparatus 10 shown in FIG. 8 doubles the volume output of fountain drink dispenser drop-in unit 12 (shown in FIG. 1) and will require six additional dispensing valves 16. The six additional dispensing valves 16 can either be incorporated in the dispensing tower 14 through an "in line" design or through a dual dispensing tower design (not shown). An additional feature of this embodiment is that the volume output of the fountain drink dispenser 12 is increased, while the retail counter space required for the fountain drink dispenser 12 is not significantly increased, thereby providing cost savings to the beverage retailer.

Figure 9:
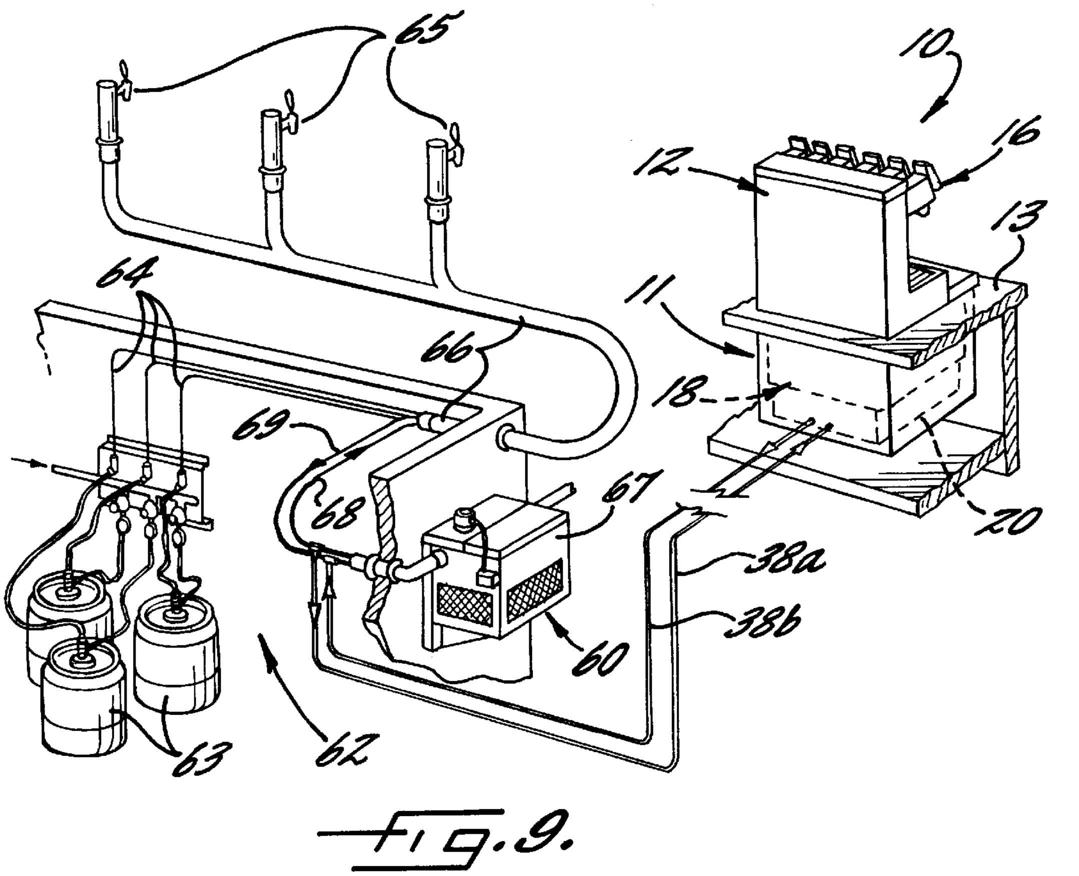
FIG. 9 is a diagram of a typical recirculating beer refrigeration system and an embodiment wherein the recirculating beer refrigeration system is used in conjunction with the dispensing apparatus according to the present invention.

In one embodiment of the dispensing apparatus 10, shown in FIG. 9, the coolant source 39 (shown in FIG. 1) is supplied by a refrigerated glycol chilling unit 60 of an otherwise conventional beer delivery system 62, such as the system shown in U.S. Pat. No. 5,564,602. Typically, and as illustrated in FIG. 9, the beer delivery system includes pressurized supply kegs 63 which are connected to the delivery lines 64. The lines 64 lead to the dispensing valves 65 through an insulated jacket 66. To chill the beer as it moves through the lines 64, there is provided a glycol chilling unit 67, which circulates the glycol through delivery and return lines 68, 69 which run in parallel with the beer delivery lines 64 through the jacket 66 and to the valves 65, and so that the chilled glycol cools the beer before it is dispensed. With the present invention, the coolant inlet and outlet lines 38*a*, 38*b* tap into the glycol lines 68, 69 respectively, so that a portion of the chilled glycol is circulated through the coolant line 38 in the cold plate 30. In public areas such as restaurants, clubs, and cafeterias, where a recirculating beer system is used to chill beer that is served on tap, the recirculating system can advantageously be used to help chill the carbonated or non-carbonated beverages dispensed by the dispenser 12, providing efficiency and cost savings to the retailer.

As will be apparent, the dispensing apparatus 10 according to the present invention utilizes a cooling corduit embedded in the cold plate of the dispensing apparatus to enhance the cooling provided by bulk refrigerants to the dispensed beverages. The dispensing apparatus therefore provides a more efficient beverage dispenser that is capable of dispensing a large volume of chilled beverages in multiple flavors while minimizing the operating and maintenance costs of the system to the retailer through its design and compatibility with other refrigeration systems.

Undoubtedly, many modifications and other embodiments of the invention will come to mind to one skilled in the art to which this invention pertains having the benefit of the teachings presented in the foregoing descriptions and the associated drawings. For example, the present invention has been described with reference to a fountain drink dispenser drop-in counter unit, although the device could be used in connection with any drink dispenser, such as a counter top unit, where it is desirable to dispense chilled beverages. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation, the scope of the invention being set forth in the following claims.

That which is claimed is:

1. An apparatus for dispensing a cool beverage comprising:

a housing, an ice bin in said housing and which includes a cold plate such that the ice which is received in said bin is in heat exchange relationship with a surface of said cold plate to thereby cool the same, at least one dispensing valve mounted to said housing, at least one beverage conduit having a portion thereof embedded in said cold plate and extending within a plane which is generally parallel to said surface of the cold plate, and with said one beverage conduit leading to said one valve, a cooling conduit having a portion thereof embedded in said cold plate so as to lie in a plane which is parallel to said plane of said beverage conduit and on the side thereof which is opposite said surface of said cold plate, whereby a cooling medium may be passed through said cooling conduit to supplement the cooling of the cold plate provided by the ice in said bin.

2. The apparatus as defined in claim 1 wherein said beverage conduit and said cooling conduit are each of a serpentine configuration within said cold plate.

3. The apparatus as defined in claim 2 further comprising a refrigeration system for circulating a cooling medium through said cooling conduit.

4. The apparatus as defined in claim 3 wherein said refrigeration system comprises a refrigerated glycol chilling unit which circulates cooled glycol through said cooling conduit.

5. An apparatus for selectively dispensing a plurality of different cool beverages comprising:

a first beverage dispensing unit comprising a dispensing valve and a delivery line having one end adapted for connection to a source of the first beverage and an opposite end connected to said dispensing valve, a second beverage dispensing unit comprising (a) a housing, (b) an ice bin in said housing and which includes a metal cold plate such that the ice which is received in said bin is in heat exchange relationship with a surface of said cold plate to thereby cool the same, (c) at least one dispensing valve mounted to said housing, (d) at least one beverage conduit having a portion thereof embedded in said cold plate, and with said beverage conduit leading to said one dispensing valve on said housing, (e) a cooling conduit having a portion thereof embedded in said cold plate, and a refrigerated glycol chilling unit for circulating chilled glycol into heat exchange relationship with said delivery line of said first beverage dispensing unit and through said cooling conduit of said second beverage dispensing unit, whereby the chilled glycol cools a first beverage as it passes through said delivery line of said first beverage dispensing line, and the chilled glycol passing through said cooling conduit of said second beverage dispensing unit supplements the cooling of the cold plate provided by the ice in said bin.

6. The apparatus as defined in claim 5 wherein said one beverage conduit of said second beverage dispensing unit extends within a plane which is generally parallel to said surface of the cold plate, and wherein said cooling conduit of said second beverage dispensing unit lies in a plane which is on the side of said plane of said beverage conduit which is opposite said surface.

7. The apparatus as defined in claim 6 wherein said beverage conduit and said cooling conduit are each of a serpentine configuration within said cold plate.

8. The apparatus as defined in claim 7 wherein said second beverage dispensing unit comprises a plurality of said dispensing valves mounted to said housing, and a plurality of said beverage conduits leading to respective ones of said dispensing valves on said housing.

9. The apparatus as defined in claim 8 wherein said plurality of beverage conduits are disposed in respective planes within said cold plate which are parallel to said surface of said cold plate, and wherein said cooling conduit lies in a plane which is on the side of said planes of said beverage conduits which is opposite said surface.

10. The apparatus as defined in claim 5 further comprising a temperature sensor mounted to said cold plate, and a valve system which is responsive to said temperature sensor for causing the temperature of the glycol in said cooling conduit to increase when the temperature of the cold plate reaches a predetermined low level to thereby prevent freezing of the one beverage conduit.

11. The apparatus as defined in claim 5 wherein the refrigerated glycol chilling unit delivers the glycol to the cooling conduit at a temperature of between about 26° to 32° F.

12. A method of dispensing a cool beverage comprising the steps of flowing a beverage through a beverage conduit which is embedded in a metal cold plate and which lies in a plane which is parallel to a surface of the cold plate, and while maintaining the surface of the cold plate in heat exchange relation with ice so as to cool the cold plate and the beverage flowing through the beverage conduit, circulating a cooling medium through a cooling conduit which is embedded in the cold plate and lies in a plane which is parallel to the plane of the beverage conduit and on the side thereof which is opposite said surface of the cold plate, and such that the cooling medium further cools the cold plate and the beverage flowing through the beverage conduit, and selectively dispensing the beverage from the beverage conduit through a valve which is connected to the beverage conduit.

13. The method as defined in claim 12 wherein the cooling medium is chilled glycol.

14. The method as defined in claim 13 comprising the further step of flowing water through a water conduit which is embedded in the cold plate in a plane which is between the plane of said surface of the cold plate and the plane of the cooling conduit, and selectively dispensing water from the water conduit.

15. The method as defined in claim 13 comprising the further steps of sensing the temperature of the cold plate, and controlling the flow of the chilled glycol in response to the sensed temperature so as to maintain the temperature of the cold plate within a predetermined range.

* * * * *